United States Patent
Farrington et al.

(10) Patent No.: US 8,122,243 B1
(45) Date of Patent: Feb. 21, 2012

(54) SHIELDING IN WIRELESS NETWORKS

(75) Inventors: Ricardo T. Farrington, Campbell, CA (US); Terrin Eager, Campbell, CA (US); Dong Nguyen, San Jose, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 767 days.

(21) Appl. No.: 12/220,216

(22) Filed: Jul. 22, 2008

Related U.S. Application Data

(60) Provisional application No. 60/951,346, filed on Jul. 23, 2007.

(51) Int. Cl.
*H04L 29/14* (2006.01)

(52) U.S. Cl. ............ 713/154; 726/22; 726/26; 380/270; 380/273

(58) Field of Classification Search ........................ None
See application file for complete search history.

(56) References Cited

U.S. PATENT DOCUMENTS

| | | | |
|---|---|---|---|
| 7,058,796 B2 * | 6/2006 | Lynn et al. | 713/1 |
| 2007/0050777 A1 * | 3/2007 | Hutchinson et al. | 718/104 |
| 2008/0052779 A1 * | 2/2008 | Sinha et al. | 726/22 |
| 2008/0313458 A1 * | 12/2008 | Fascenda et al. | 713/160 |

OTHER PUBLICATIONS

Fluhrer, Scott, et al., "Weaknesses in the Key Scheduling Algorithm of RC4", Proceedings of the 4th Annual Workshop of Selected Areas of Cryptography, 2001, http://drizzle.com/~aboba/IEEE/rc4_ksaproc.pdf, (accessed Jul. 14, 2008) 23 pages.

* cited by examiner

*Primary Examiner* — Minh Dinh
*Assistant Examiner* — Venkatanarayanan Perungavoor
(74) *Attorney, Agent, or Firm* — Blakely, Sokoloff, Taylor & Zafman LLP

(57) ABSTRACT

Exemplary embodiments of methods and apparatuses to provide shielding from key cracking in wireless networks are described. In one embodiment, a first frame having a first content is identified. Determination is made whether the first frame needs to be shielded. A second frame having at least a portion of the first content is transmitted in response to determining that the first frame needs to be shielded. The first frame has data encrypted with a first encryption and the second frame has data encrypted with a second encryption.

36 Claims, 8 Drawing Sheets

SHIELDING IN WIRELESS NETWORKS

CROSS-REFERENCE TO RELATED APPLICATION

This application claims the benefit of priority to U.S. Provisional Application No. 60/951,346 entitled "WEP Shield Specification" filed Jul. 23, 2007, which is incorporated herein by reference in its entirety.

FIELD

At least some embodiments of the present invention generally relate to wireless networks, and more particularly, to shielding from a key decryption.

BACKGROUND

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

Although WLANs provide users with increased mobility over wired LANs, the quality of communications over a WLAN may vary for reasons that are not present in wired LANs. For example, everything in the environment may behave as a reflector or attenuator of a transmitted signal. As such, small changes in the position of a computer in a WLAN may affect the quality and strength of a signal sent by the computer.

Wired Equivalent Privacy ("WEP") is a protocol for encrypting wireless packets on IEEE 802.11 network. Although the WEP protocol is known to be insecure and has been superseded by Wi-Fi Protected Access ("WPA") protocol, it still is in widespread use today. Typically, in WEP protocol a fixed secret key is concatenated with known initialization vector ("IV") modifiers to encrypt different messages. In WEP-protected networks, both an access point and radio stations may share common key Rk. For each packet, a 24-bit IV may be chosen. A per packet key K=IV|Rk key may be used to encrypt the packet using the RC4 stream cipher.

In 2001, Fluhrer, Martin and Shamir in paper entitled "Weaknesses in the Key Scheduling Algorithm of RC4" presented an attack against RC4 encryption (aircrack-ng implementation: http://www.aircrack-ng-ng.org). In 2005, Andreas Klein showed an improved way of attacking RC4 and can discover the WEP key with a significantly reduced number of frames (aircrack-ptw implementation: http://www.cdc.illformatik.tu-darmstadt.de/aircrack-ptw).

Both attacks monitor the network traffic and collect ARP-reply packets sent from the Access Point to discover the WEP keys. Typically, the first 16 bytes of clear text of an ARP packet are fixed for every ARP packet (AA AA 03 00000008 06 . . . ). Further, ARP-reply packets having a fixed size, can usually be easily distinguished from other network packets.

Typically, by applying an exclusive-or ("XOR") operation to a captured encrypted ARP packet with these fixed patterns, hackers may recover the first 16 bytes of the key stream. Collecting key stream bytes plus the IVs from packets may determine the WEP Keys.

Accordingly, such encryption attacks can present security problems in wireless networks.

SUMMARY

Exemplary embodiments of methods and apparatuses to provide shielding from key cracking in wireless networks are described. In one embodiment, the method comprises identifying a first frame having a first content, wherein the first frame is sent in response to a request by a requestor. The method further comprises determining whether the first frame needs to be shielded. The method further comprises transmitting a second frame having at least a portion of the first content in response to determining, wherein the first frame has data encrypted with a first encryption and the second frame has data encrypted with a second encryption.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
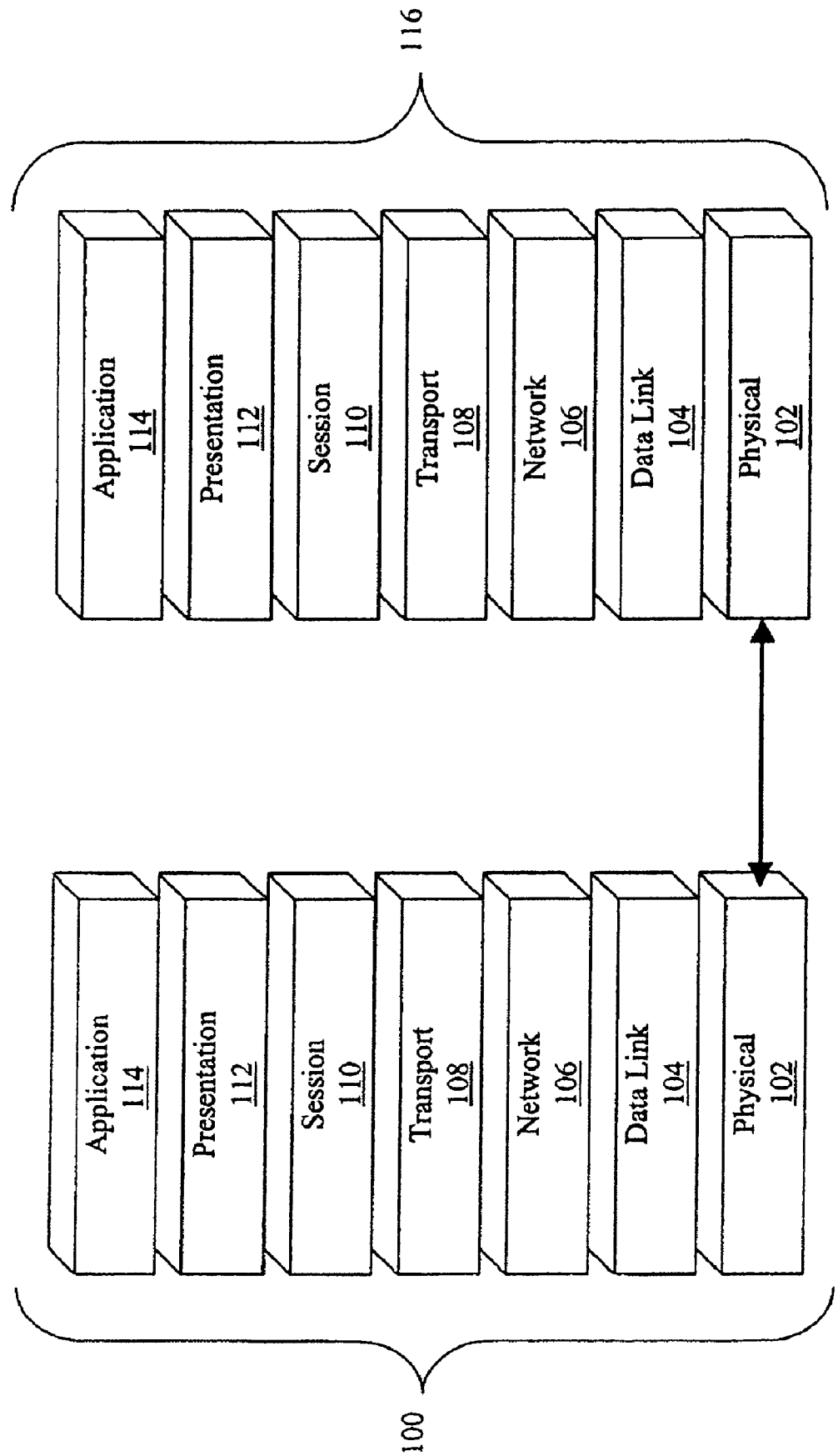
FIG. 1 shows an exemplary Open Systems Interconnection ("OSI") seven layer model.

Exemplary embodiments of methods and apparatuses to provide shielding from key cracking in wireless networks are described. In one embodiment, a WEP shielding in a wireless network is performed when a certain type of frame, e.g., an Address Resolution Protocol ("ARP") frame is identified. More specifically, when the certain type of frame, e.g., an ARP frame, is identified, a duplicate frame is automatically transmitted. The duplicate frame has at least a portion of the content of the identified original frame. The duplicate frame has data encrypted with a key that is different from the key that is used to encrypt data in the original frame. The duplicate frame appears indistinguishable from the original frame to a hacker, and is ignored by all valid stations of the system, as described in further detail below.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

With reference to FIG. 1, an exemplary Open Systems Interconnection ("OSI") seven layer model is shown, which represents an abstract model of a networking system divided into layers according to their respective functionalities. In particular, the seven layers include physical layer 102 corresponding to layer 1, data link layer 104 corresponding to layer 2, network layer 106 corresponding to layer 3, transport layer 108 corresponding to layer 4, session layer 110 corresponding to layer 5, presentation layer 112 corresponding to layer 6, and application layer 114 corresponding to layer 7. Each layer in the OSI model only interacts directly with the layer immediately above or below it, and different computers 100 and 116 can communicate directly with each other only at the physical layer 102. However, different computers 100 and 116 can effectively communicate at the same layer using common protocols. For example, in one exemplary embodiment, computer 100 can communicate with computer 116 at application layer 114 by propagating a frame from application layer 114 of computer 100 through each layer below it until the frame reaches physical layer 102. The frame can then be transmitted to physical layer 102 of computer 116 and propagated through each layer above physical layer 102 until the frame reaches application layer 114 of computer 116.

The IEEE 802.11 standard for wireless local area networks ("WLANs") operates at the data link layer 104, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
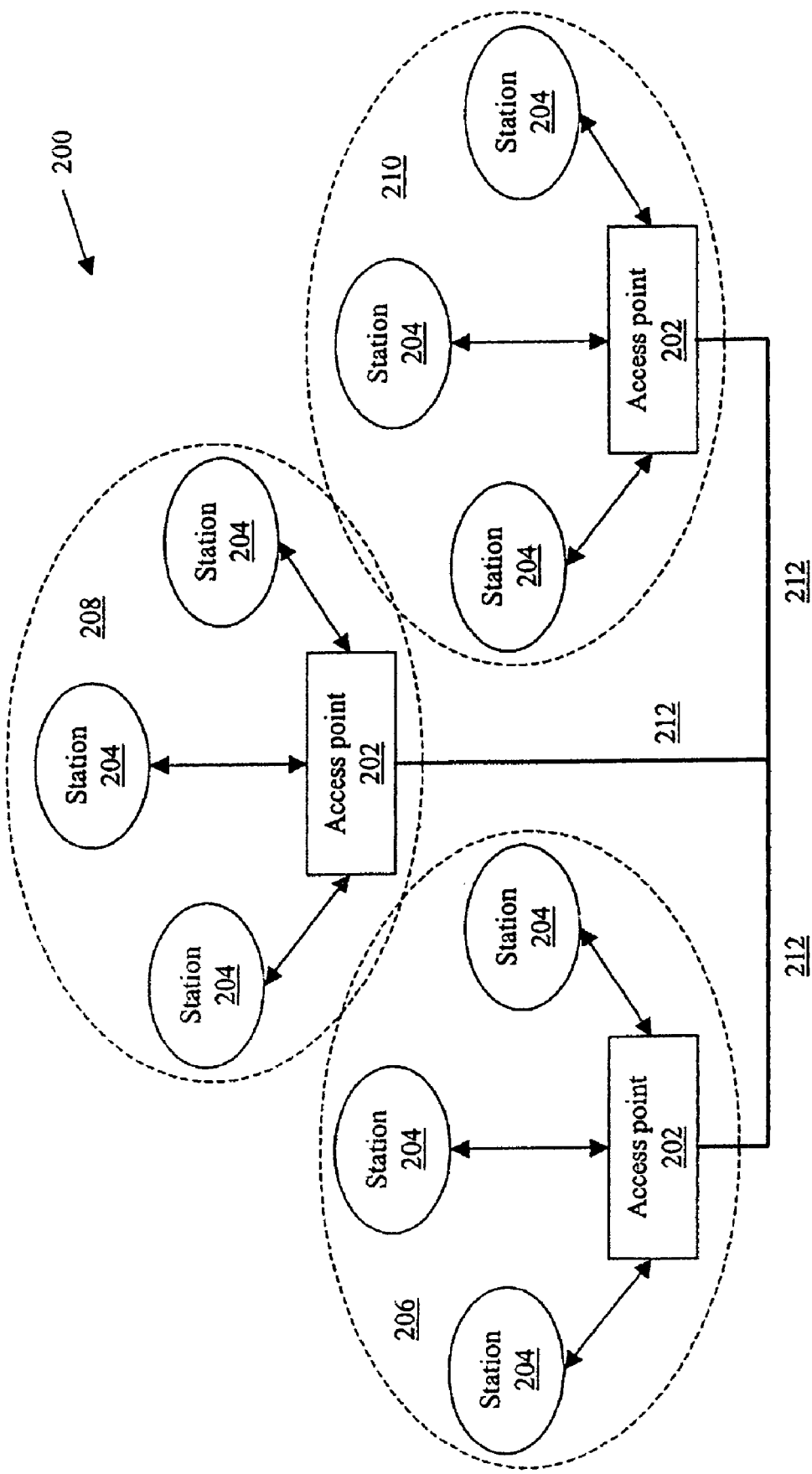
FIG. 2 shows an exemplary extended service set in a wireless local area network ("WLAN")

With reference to FIG. 2, an exemplary extended service set 200, which forms a WLAN according to the IEEE 802.11 standard, is depicted having basic service sets ("BSS") 206, 208, and 210. Each BSS can include an access point ("AP") 202 and stations 204. A station 204 is a component that can be used to connect to the WLAN, which can be mobile, portable, stationary, and the like, and can be referred to as the network adapter or network interface card. For instance, a station 204 can be a laptop computer, a personal digital assistant, and the like. In addition, a station 204 can support station services such as authentication, deauthentication, privacy, delivery of data, and the like.

Each station 204 can communicate directly with an AP 202 through an air link, such as by sending a radio or infrared signal between WLAN transmitters and receivers. Each AP 202 can support station services, as described above, and can additionally support distribution services, such as association, disassociation, association, distribution, integration, and the like. Accordingly, an AP 202 can communicate with stations 204 within its BSS 206, 208, and 210, and with other APs 202 through medium 212, called a distribution system, which forms the backbone of the WLAN. This distribution system 212 can include both wireless and wired connections.

Figure 3:
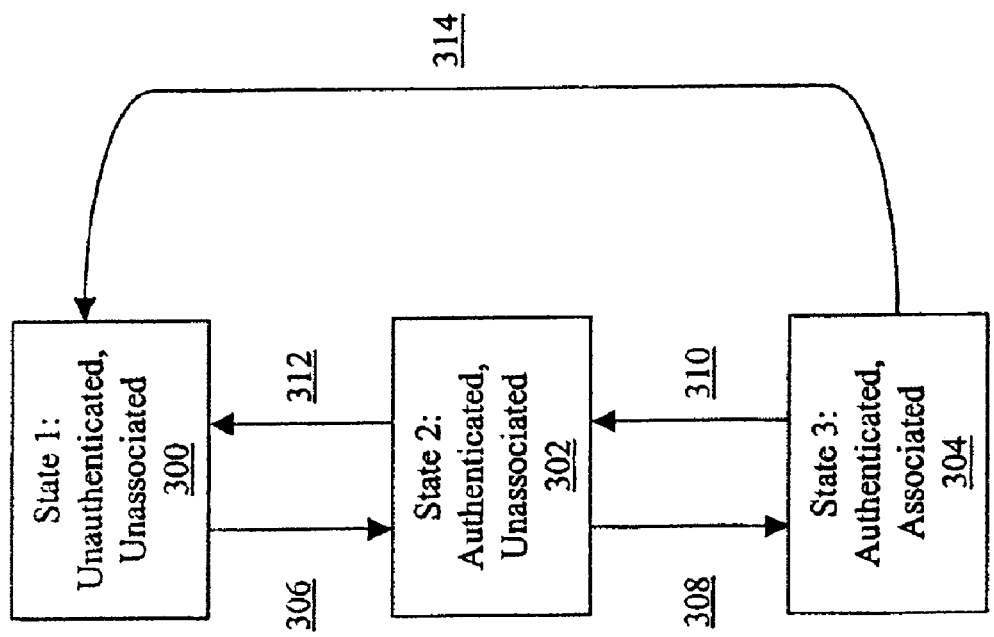
FIG. 3 is an exemplary flow diagram illustrating various states of stations in a WLAN.

With reference to FIGS. 2 and 3, each station 204 must be authenticated to and associated with an AP 202 in order to become a part of a BSS 206, 208, or 210, under the IEEE 802.11 standard. Accordingly, with reference to FIG. 3, a station 204 begins in State 1 (300), where station 204 is unauthenticated to and unassociated with an AP 202. In State 1 (300), station 204 can only use a limited number of frame types, such as frame types that can allow station 204 to locate and authenticate to an AP 202, and the like.

If station 204 successfully authenticates 306 to an AP 202, then station 204 can be elevated to State 2 (302), where station 204 is authenticated to and unassociated with the AP 202. In State 2 (302), station 204 can use a limited number of frame types, such as frame types that can allow station 204 to associate with an AP 202, and the like.

If station 204 then successfully associates or reassociates 308 with AP 202, then station 204 can be elevated to State 3 (304), where station 204 is authenticated to and associated with AP 202. In State 3 (304), station 204 can use any frame types to communicate with AP 202 and other stations 204 in the WLAN. If station 204 receives a disassociation notification 310, then station 204 can be transitioned to State 2. Furthermore, if station 204 then receives deauthentication notification 312, then station 204 can be transitioned to State 1. Under the IEEE 802.11 standard, a station 204 can be authenticated to different APs 202 simultaneously, but can only be associated with one AP 202 at any time.

With reference again to FIG. 2, once a station 204 is authenticated to and associated with an AP 202, the station 204 can communicate with another station 204 in the WLAN. In particular, a station 204 can send a message having a source address, a basic service set identification address ("BSSID"), and a destination address, to its associated AP 202. The AP 202 can then distribute the message to the station 204 specified as the destination address in the message. This destination address can specify a station 204 in the same BSS 206, 208, or 210, or in another BSS 206, 208, or 210 that is linked to the AP 202 through distribution system 212.

Although FIG. 2 depicts an extended service set 200 having three BSSs 206, 208, and 210, each of which include three stations 204, it should be recognized that an extended service set 200 can include any number of BSSs 206, 208, and 210, which can include any number of stations 204. Stations 204 and access points 202 exchange messages that include one or more frames. Typically, a frame includes a data packet of fixed or variable length which may be encoded by a data link layer.

Figure 4:
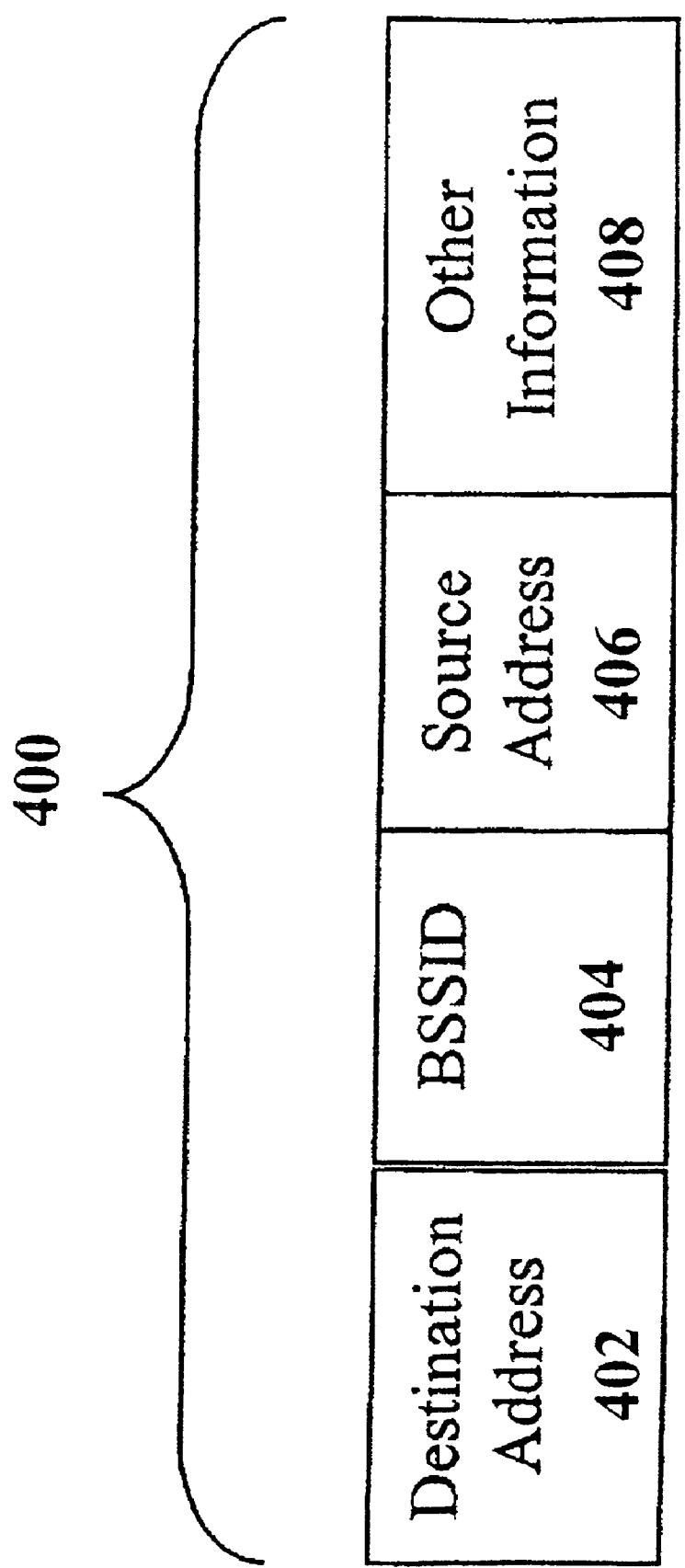
FIG. 4 shows one embodiment of a header that may be included in a frame.

FIG. 4 shows one embodiment of a header that may be included in a frame. The frame can include a header 400, having a destination address 402, a basic service set identification ("BSSID") 404, a source address 406, and other information 408. For example, header 400 may have a destination address 402 set to one of stations 204, a BSSID 404 set to one of APs 202, and a source address 406 set to another one of stations 204.

Figure 5:
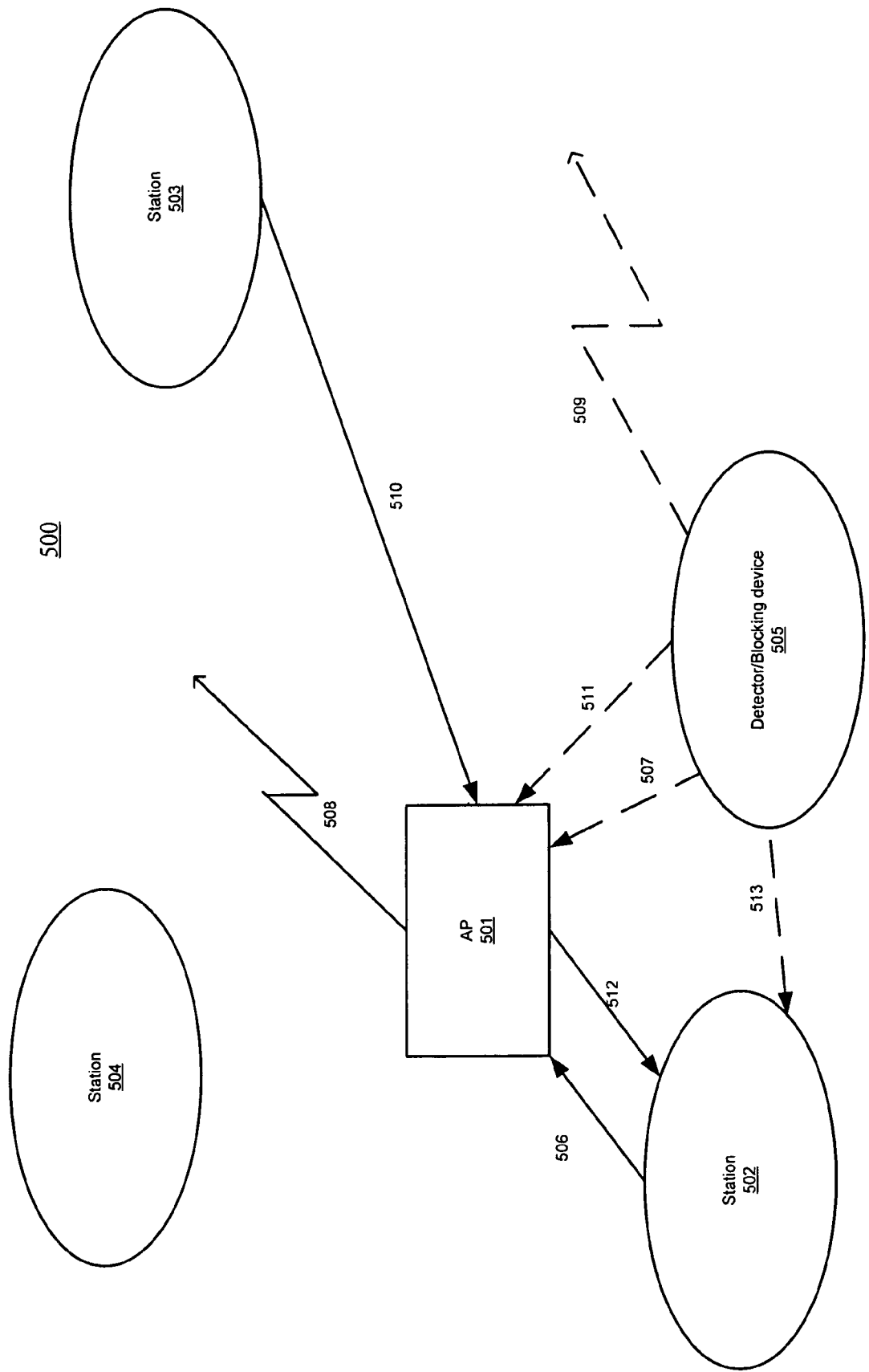
FIG. 5 shows one embodiment of a network system to perform encryption shielding.

FIG. 5 shows one embodiment of a wireless network system to perform encryption shielding. As shown in FIG. 5, system 500 includes an access point, such as AP 501, a plurality of stations, such as stations 502-504, and a detector/shielding device, such as device 505. In one embodiment, detector/shielding device 505 monitors traffic in the system, detects frames injected by a hacker, and provides WEP shielding, as described in further detail below.

In one embodiment, device 505 is incorporated into AP 501. In another embodiment, device 505 is separate from AP 501. In one embodiment, detector/shielding device 505 is implemented on SmartEdge Sensor™ and acts as an access point device. In one embodiment, a detector/shielding device, such as device 505, is located in the BSS, e.g., BSS 206 of FIG. 2, and receives transmissions sent from and received by stations located in the same BSS, such as BSS 206, and stations located in other BSSs, such as BSS 208 and 210 of FIG. 2. Note that device 505 need not necessarily be physically adjacent to stations, such as stations 204. Instead, device 505 can be sufficiently near stations such that the reception range of device 505 covers the stations in the monitored BSSs.

A detector/shielding device, such as device 505, can be a station and/or an AP in the wireless local area network. Additionally, the detector/shielding device can be mobile, portable, stationary, and the like. For instance, the detector/shielding device can be a laptop computer, a personal digital assistant, and the like. In addition, the detector/shielding device can be used by a user as a diagnostic tool, by an administrator as an administrative tool, and the like. In one embodiment, a detector/shielding device, such as device 505, receives transmitted frames in advance of examining them. The received frames can be stored or buffered as they are received. In one embodiment, the stored or buffered frames are subsequently retrieved from where they were stored or buffered and examined to identify the frames to determine whether the frames needs to be blocked.

In one embodiment, network system 500 performs an Address Resolution Protocol ("ARP"). ARP is the method for finding a host's hardware address when only its network layer address is known. Typically, an ARP protocol behavior in an 802.11 wireless environment is as follows: an originator station, such as station 502, looking for a destination transmits an ARP request, such as ARP request 506, to an access point, such as AP 501. Next, the access point, such as AP 501, retransmits an ARP request, such as ARP request 508, to all stations in the system 500. For example, the access point can broadcasts the ARP request to all stations in the system 500. Next, a destination station, such as station 503, sends an ARP reply, such as ARP reply 510, to the access point. The destination station can be a wireless station, or a wired station, or both. Next, the access point, such as AP 501 retransmits the ARP reply sent from the destination station, such as ARP reply 512, to the originator station.

Figure 6:
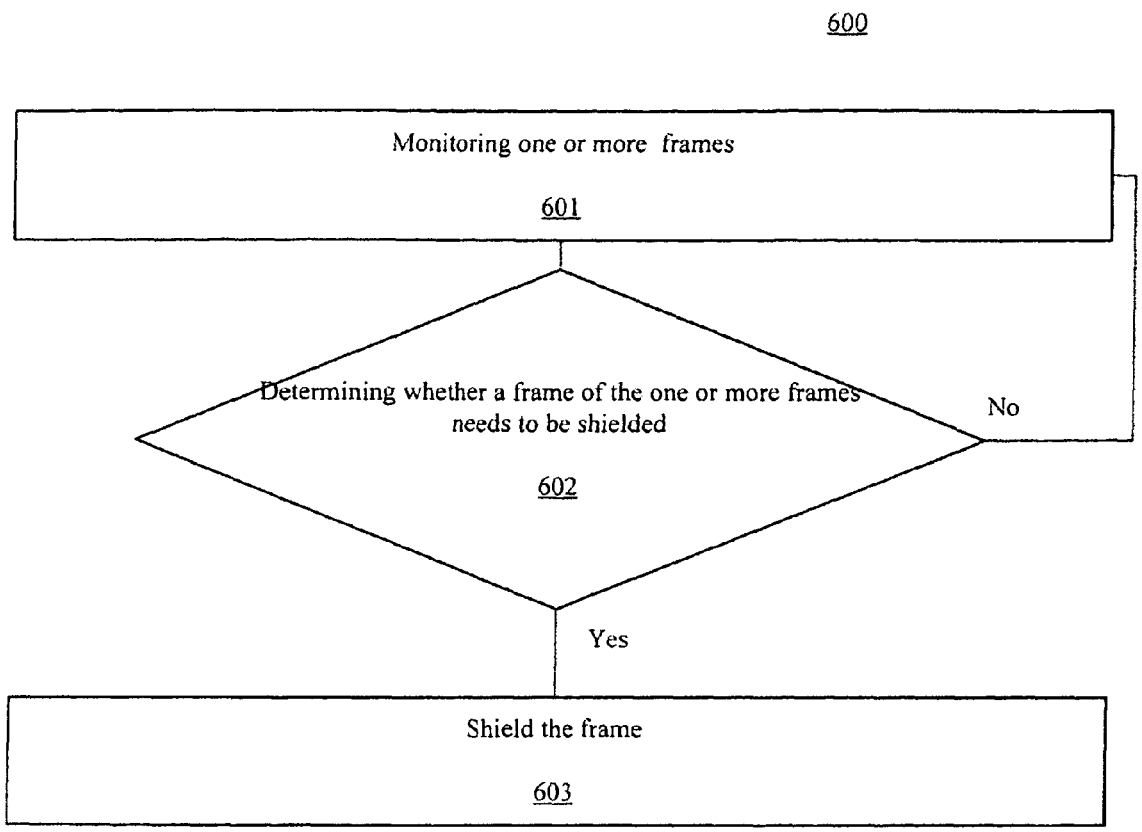
FIG. 6 shows a flowchart of one embodiment of a method to perform WEP shielding in wireless networks.

FIG. 6 shows a flowchart of one embodiment of a method to perform WEP shielding in wireless networks. Method 600 begins with operation 601 that involves monitoring one or more frames exchanged between one or more stations, such as stations 502-504, and one or more access points, such as AP 501. The current information about the wireless (e.g., WiFi™) traffic may be analyzed and collected through, e.g., sampling of WiFi™ channels. The information about the traffic may include an address of an access point AP and one or more Media Access Control ("MAC") addresses of the stations; session traffic count between AP and Stations, a current frame sequence, type of security being used in the system, Service Set Identifier ("SSID") of an access point, Access Control Lists ("ACL") information from the Enterprise™ System, and Event/Alarm system information to start the WEP Shielding process. The current frame sequence may be determined by maintaining a current frame sequence counter as well as from the received frames themselves. In one embodiment, detector/shielding device, such as device 505, gathers the information about the current traffic through sampling the WiFi channels and performs the WEP Shielding in the same time.

In one embodiment, to identify the transmissions sent from and received by the station, a detector, such as device 505, obtains the MAC address of the station, which can be obtained from the source and destination address fields of the transmitted frames. The MAC address may also be obtained directly from the station. Alternatively, the MAC address of the station may be stored and retrieved from a table of MAC address assignments, which can be maintained by an administrator of the WLAN.

Additionally, if a particular AP that the station is attempting to communicate with is known, the particular channel that the AP is operating on can then be monitored. If the station is attempting to communicate with multiple APs and the identity of those APs are known, then the particular channels that those APs are operating on can then be monitored.

Furthermore, the detector, such as device 505, can scan the channels of the wireless local area network to receive transmissions sent from and received by the station with known or unknown APs. The detector/shielding device can scan all the available channels in the WLAN. Alternatively, specific channels may be selected to be scanned.

Method continues with operation 602 that involves determining whether the monitored frame needs to be shielded. If the frame does not need to be shielded, method 600 returns to operation 601. Typically, a system attack is stimulated by a particular ("injected") packet sent from a requestor, e.g., a hacker. The injected packet is designed to cause a response from a wireless subsystem. For example, the injected packet may cause through a broadcast a response from a wireless subsystem. By viewing the responses from the wireless subsystem, the hacker may decrypt an encryption key of the system. For example a frame may be received be received by detector/shielding device 505. Then, a determination is made whether this frame is a type of frame that needs to be shielded, e.g., an ARP type of frame.

Typically, four types of packets may be injected by the hacker, such as a wireless ARP packet, a wired ARP packet, wireless ARP packet with Quality of Service parameter ("QoS") and a wired ARP packet with QoS parameter. In one embodiment, determination that one of the monitored frames needs to be shielded includes determining whether the frame is a frame injected by a hacker. For example, ARP frames may be monitored to determine whether the frame is a type of frame that needs to be shielded, e.g., an ARP type of frame. If the frame needs to be shielded, method 600 continues with operation 603 that involves performing shielding of the frame. For example, if it is determined that the frame is the injected frame, the frame is shielded from the system, such as system 500, as described in further detail below.

The WEP-Shield feature provides protection from WEP key cracking of an Access Point software, for example, the open source aircrack-ng software. The WEP-Shield feature addresses this issue by sending a number of frames to disable the ability of both aircrack-ng and aircrack-ptw implementation to crack the WEP key. That is, the WEP shielding responds to the injected packet by sending out duplicate replies. In one embodiment, WEP Shielding is performed by detector/shielding device, such as device 505, that acts as an access point and sends out one or more shielding packets ("poisoned frames") to confuse a hacker, as described in further detail below.

The poisoned frames are the packets that are not part of the normal traffic pattern of the system. The poisoned packets may be stimulated by an injected frame. The poisoned frames are designed to confuse the hacker, e.g., an aircrack-ng and aircrack-ptw software. The poisoned frames are designed in assumingly correct manner, such that hacker's software cannot distinguish them from the normal traffic frames and has to decrypt the encryption of the system based on the poisoned frames. The poisoned frames may be encrypted to mimic the encryption of the frames that are part of the normal traffic pattern of the system. The poisoned frames, however, have data encrypted with an encryption that is different from the encryption of the data in the frames that are part of the normal traffic in the system. As such, the poisoned frames are ignored by all valid stations of the system. In one embodiment, the valid station is a station that has been authenticated to and associated with an access point of the BSS. In one embodiment, a first frame having a first content is identified. The first frame may be sent in response to a request issued by a requestor, e.g., a hacker. In response to identifying of the first frame, a second ("poison") frame having at least a portion of the first content is transmitted. The second frame is such that it appears indistinguishable from the first frame to the requestor, e.g., a hacker.

The poisoned frame has data encrypted with an alternate encryption that is different from the encryption of the data in the first frame. For example, an original frame 510 sent from station 503 to AP 501 may be identified, and poisoned frame 513 may be transmitted by detector/shielding device 505 to station 502 in response to identifying of frame 510. The encryption of the data in the poisoned frame is different from the encryption of the data in the original frame to confuse a hacker. Properly encrypted packets with alternative encryptions sent out by the detector/shielding device may cause the hacker to indefinitely search for the proper key, direct the hacker to an incorrect key, or both. That is, the poisoned frames are sent out to protect the encryption of the wireless system from being decrypted by a hacker. In one embodiment, the poisoned frame has data encrypted with a valid WEP key, and an invalid integrity check value ("ICV"). The valid WEP key may be used to make the poisoned frame indistinguishable to the hacker, and an invalid ICV may be used to confuse the hacker and to shield the system from being decrypted by the hacker. Also, the invalid ICV prevents the poisoned frames from being used by valid stations. That is, the poisoned frames with data encrypted with the invalid ICVs are ignored by all valid stations of the system.

One of the keys to WEP shielding is to have the poisoned frames be stealth. If the frames are not stealth the hackers may quickly find ways to filter out the poisoned frames which will break the shield's effectiveness. The stealth techniques are used to implement a multilayer defense to maintain a strong shield. That is, the poisoned frames are sent using one or more stealth techniques that makes the stimulated shielding packets indistinguishable from real replies. The stealth techniques used to send the poisoned frames may include mimicking the exact frame format, current time stamps, correct sequence number, real AP MAC address and station MAC address; real AP MAC address with fake station MAC address, fake AP MAC address with fake station MAC address; sending frames with variable signal strength, sending poisoned frames based on traffic, or any combination thereof, as described in further detail below. In one embodiment, the stealth technique includes providing the poisoned frame having the same format as the original frame to mimic the format of original frame. For example, each of the poisoned frame and the original frame may have an Address Resolution Protocol ("ARP") format. The poisoned frame may be a duplicate of the original frame. For example, the original frame 512 may be an ARP reply frame sent from AP 501 to station 502, and the poisoned frame 513 may be the ARP reply frame sent from detector/shielding device 505 to station 502, as described in further detail below.

In one embodiment, the stealth technique includes providing the poisoned frame having a correct frame sequence number that is associated with the current frame sequence corresponding to the current traffic of the system. The current frame sequence number can be determined from monitoring the frame traffic in the system, as described above. The current frame sequence number can be determined by maintaining current frame sequence counter of the system. That is, the data traffic in the system outside of the injected packet is monitored to track the frame sequence number, so that a current frame sequence number for a poisoned frame is determined from this monitoring.

In one embodiment, the stealth technique includes providing the poisoned frame, which includes a real AP MAC address and a real station MAC address. In another embodiment, the poisoned frame includes a real AP MAC address and a fake station MAC address. In yet another embodiment, the poisoned frame includes a fake AP MAC address and a fake station MAC address. In one embodiment, the poisoned frame has a valid source MAC address, valid AP MAC address, and a random IV number. In another embodiment, the poisoned frame has a fake station address.

In one embodiment, the stealth technique includes transmitting the poisoned frame with variable signal strength because of the different physical location of the access point and the detector/shielding device to prevent the poisoned frames from being recognized by the hacker. That is, the signal strength of the transmitted poisoned frame varies, so that the poisoned frame signal does not appear static and cannot be identified based on the signal strength by the hacker.

In one embodiment, an original frame transmitted to an access point is identified, and a poisoned frame is transmitted to the access point based on the identifying of the original frame. In one embodiment, the original frame is an injected frame. For example, an injected original frame 506 may be transmitted to AP 501, and a poisoned frame 507 that is a duplicate of frame 506 may be transmitted to AP 501 by detector/shielding device 505 in response to transmitting of the injected frame 506.

In one embodiment, a retransmission of the injected frame by the access point is identified, and a poisoned frame is retransmitted based on the retransmission. For example, a broadcast of the injected original frame 508 may be identified, and a poisoned frame 509 that is a duplicate of frame 508 may be broadcast by detector/shielding device 505 in response to identifying of the broadcast of the injected original frame 508. In one embodiment, the original frame 506 may be an ARP request frame, and the poisoned frame 513 may be a duplicate ARP request frame.

In one embodiment, a transmission rate of the poisoned frame is associated with the transmission rate of the previous original frame to be indistinguishable to the hacker. For example, the transmission rate of the poisoned frame may be the same as the transmission rate of the original frame. The traffic outside of the injected packet may be monitored, as described above, and a transmission rate is tracked. The transmission rate for the poisoned frame may be determined based on the transmission rate of a previous frame that is a part of the normal traffic of the system. Typically, a transmission rate is associated with a NAV setting parameter embedded in the packet. In one embodiment, the transmission rate of the poisoned frame is the same as the transmission rate of the original frame.

Additionally, the poisoned frames are traffic based not time based. The poisoned frame is transmitted if it is determined that one of the monitored frames needs to be shielded. For example, if it is determined that the frame is an ARP frame, the poisoned frame is transmitted. In one embodiment, determining that the frame is an ARP frame is performed using one of technique known to one of skilled in the art of wireless networks. That is, poisoned frames are not unsolicited frames. The poisoned frames are sent when it is determined that a monitored frame needs to be shielded to prevent WEP shielding from being identified.

Figure 7:
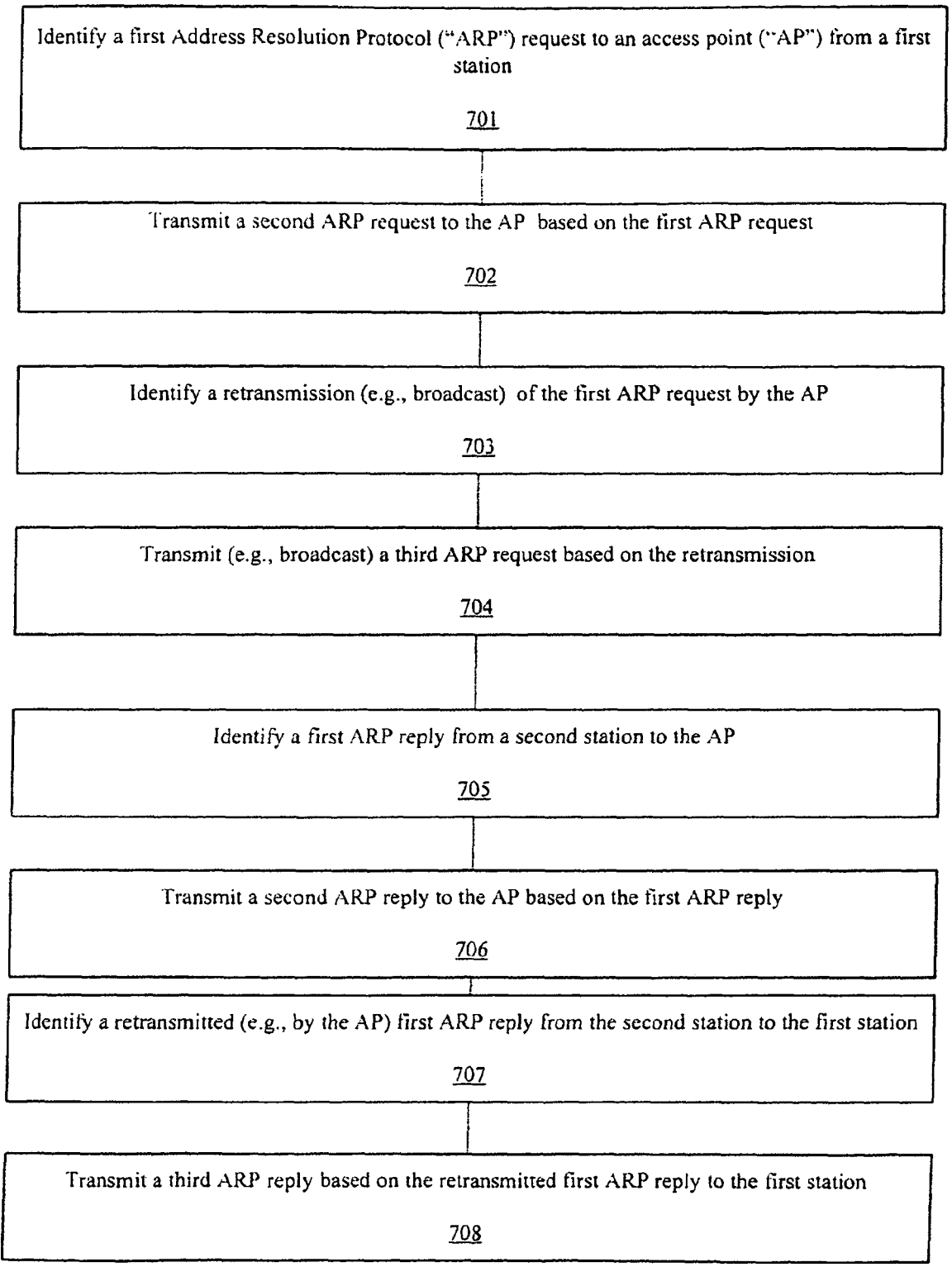
FIG. 7 shows a flowchart of another embodiment of WEP shielding.

FIG. 7 shows a flowchart of another embodiment of WEP shielding. Method 700 duplicates the actions of a wireless subsystem with respect to an ARP protocol. Method 700 begins with operation 701 that involves identifying a first address resolution protocol ("ARP") request to an access point. At operation 702 a second ARP request having at least a portion of a content of the first ARP request is transmitted to the access point based on the first ARP request. For example, a duplicate ARP request is transmitted to the access point (e.g. "tx_arp_rebroadcast") in response to identifying of the ARP request from an originator station to the access point. A retransmission of the first ARP ("wireless broadcast") request by the access point to all stations of the system is identified at operation 703. At operation 704 a third ARP request mimicking the "wireless broadcast" is transmitted to all stations of the system. For example, a duplicate ARP request having at least a portion of a content of the first ARP request may be wirelessly broadcast to all stations of the system in response to wireless broadcast of the ARP request by the access point. The content of the first ARP request may include a header, such as header 400, depicted in FIG. 4. For example, the duplicate ARP request having at least a portion of the header of the first ARP request may be wirelessly broadcast to all stations of the system. The duplicate ARP request has the same format as the first ARP request.

In one embodiment, the duplicate ARP request has a current frame sequence number associated with current frame traffic in the system, as described above. In one embodiment, a transmission rate of the duplicate ARP request is associated with the transmission rate of the first ARP request, as described above. In one embodiment, the duplicate ARP request is transmitted with variable signal strength, as described above. At operation 705 a first ARP reply to the access point is identified. At operation 706 a second ARP reply having at least a portion of a content of the first ARP reply is transmitted to the access point based on the first ARP reply (e.g., "tx_arp_reply"). For example, a duplicate ARP reply having at least a portion of a content of the first ARP reply may be transmitted to the access point in response to identifying the first ARP reply from a destination station to the access point. The duplicate ARP reply has data encrypted with an encryption that is different from the encryption of the data in the first ARP reply.

At operation 707, a retransmission (by the access point) of the first ARP reply is identified. At operation 708 a third ARP reply to the originator station is transmitted based on the retransmitted first ARP reply. For example, a duplicate ARP is transmitted to the originator station in response to transmitting of the ARP reply from the access point to the originator station. In one embodiment, the duplicate ARP reply has a current frame sequence number associated with a current frame traffic in the system. In one embodiment, a transmission rate of the duplicate ARP reply is associated with the transmission rate of the first ARP reply, as described above. In one embodiment, the duplicate ARP reply is transmitted with a variable signal strength, as described above. In one embodiment, the second ARP reply has an encryption that is different from the encryption of the first ARP reply. For example, the second ARP-reply packet (68 bytes length) from the detector/shielding device may include a correct source MAC address, valid AP MAC address, and a random IV number. In one embodiment, the duplicate ARP reply has a fake station address.

In one embodiment, WEP Shielding pseudocode reads as follows:

```
if( (pkt.len == wireless_arp_size w/QoS) OR (pkt.len == wire_arp_size w/QoS) )
    iQoSFlag = TRUE;
else if( (pkt.len == wireless_arp_size) OR (pkt.len == wire_arp_size) )
    iQoSFlag = FALSE;
else
    goto JustChkSeqNum;
if( pkt.toDS )
    pBSSID = pkt.Addr1; pDest = pkt.Addr3; pHost = pkt.Addr2;
else if( pkt.fmDS )
    pBSSID = pkt.Addr2; pDest = pkt.Addr1; pHost = pkt.Addr3;
else
    return;
if( *pBSSID == BSSID_to_shield )
{
    if( *pDest == BROADCAST )
    {
        tx_arp_rebroadcast_using_iQoSFlag( pkt.fmDS, Addr1=*pDest,
            Addr2=*pBSSID,
            Addr3=*pHost,
```

-continued

```
        speed=iApBcastSpeed (or 6Mbps))
    if( pkt.fmDS )
    {
        aArpOwner = *pHost;
        iApBcastSpeed = pkt.rate;
    }
    if( pkt.toDS )
    {
        /* send ARP reply using dummy source */
        tx_arp_reply_using_iQoSFlag( pkt.fmDS, Addr1=*pHost,
            Addr2=*pBSSID,
            Addr3=aArpPseudoRandomHost,
            speed=iDirectedTxRate (if valid)
    }
    } else if( fmDs AND (*pDest == aArpOwner) )
    {
        /* re-send ARP reply from real source */
        tx_arp_reply_using_iQoSFlag( pkt.fmDS, Addr1=*pDest,
            Addr2=*pBSSID,
            Addr3=*pHost,
            speed=speed from Rx'd pkt)
        aArpOwner = reset_value;
        iDirectedTxRate = pkt.rate;
        aArpPseudoRandomHost = *pHost;
    }
}
JustChkSeqNum:
if( pkt.Addr2 == BSSID_to_shield )
{
    if( (pkt.type == Mgmt) AND NOT(pkt.toDS OR pkt.fmDS) )
        save_seq_number( );
    else if( (pkt.type == Data) AND pkt.fmDS )
    {
        save_seq_number( );
        if( pkt.Addr1 == directed_pkt )
        {
            save_tx_rate_for_our_next_directed_pkt( );
            aArpPseudoRandomHost = pkt.Addr3:
        }
    }
}
```

Figure 8:
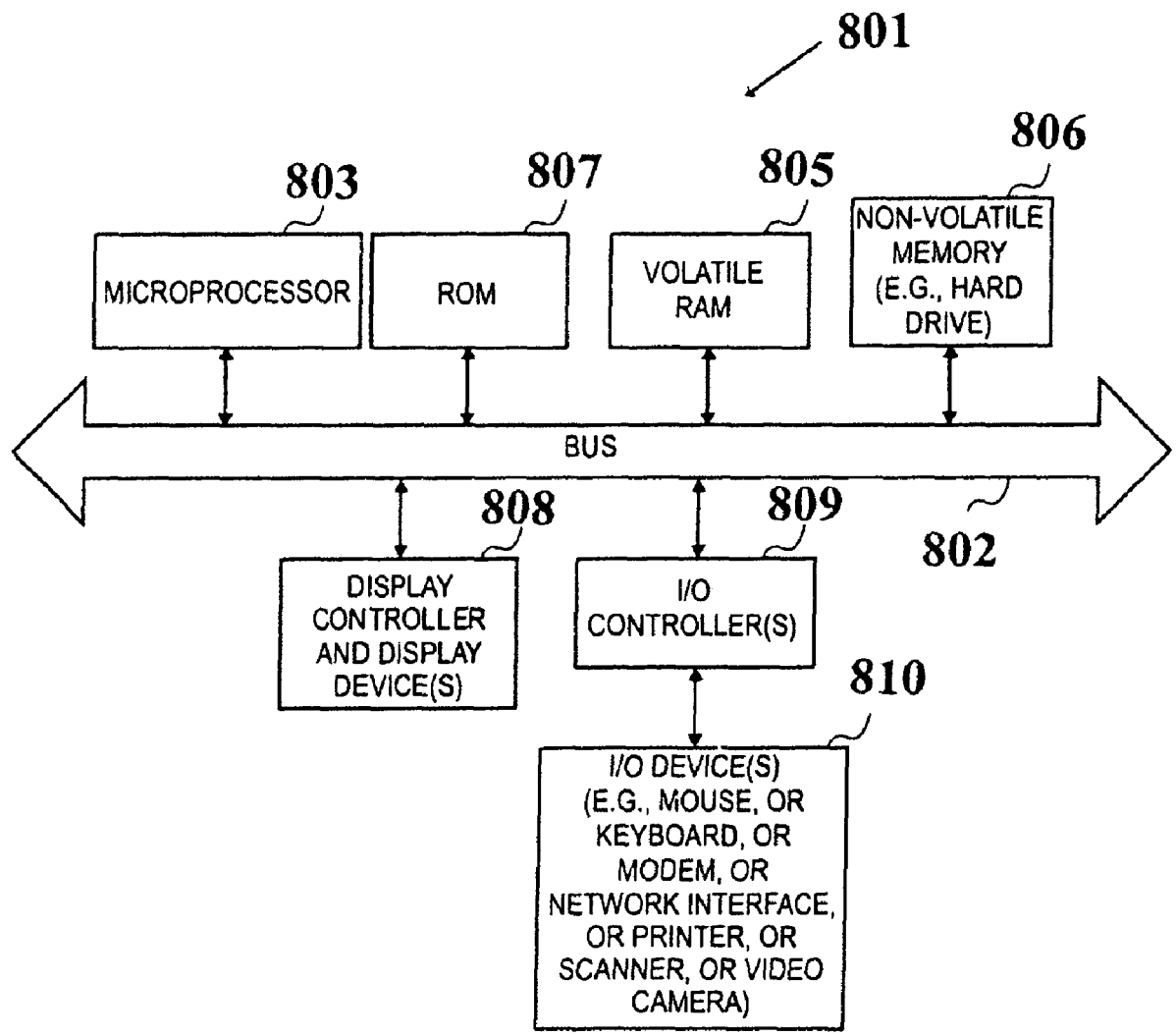
FIG. 8 shows one example of a typical computer system which may be used with the present invention

FIG. 8 shows one example of a typical computer system which may be used with the present invention. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 8, the computer system 801, which is a form of a data processing system, includes a bus 802 which is coupled to a microprocessor 803 and a ROM 807 and volatile RAM 805 and a non-volatile memory 806. The microprocessor 803, which may be, for example, a G3 or G4 microprocessor from Motorola, Inc. or IBM is coupled to cache memory 804 as shown in the example of FIG. 8. The bus 802 interconnects these various components together and also interconnects these components 803, 807, 805, and 806 to a display controller and display device(s) 808 and to peripheral devices such as input/output (I/O) devices which may be mice, keyboards, modems, network interfaces, printers, scanners, video cameras and other devices which are well known in the art. Typically, the input/output devices 810 are coupled to the system through input/output controllers 809. The volatile RAM 805 is typically implemented as dynamic RAM (DRAM) which requires power continually in order to refresh or maintain the data in the memory. The non-volatile memory 806 is typically a magnetic hard drive or a magnetic optical drive or an optical drive or a DVD RAM or other type of memory systems which maintain data even after power is removed from the system. Typically, the non-volatile memory will also be a random access memory although this is not required.

While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers and/or adapters as is well known in the art. In one embodiment the I/O controller 809 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 807, volatile RAM 805, non-volatile memory 806, or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 803, or microcontroller.

A machine readable medium can be used to store software and data which when executed by a data processing system causes the system to perform various methods of the present invention. This executable software and data may be stored in various places including for example ROM 807, volatile RAM 805, non-volatile memory 806 as shown in FIG. 8. Portions of this software and/or data may be stored in any one of these storage devices.

Thus, a machine readable medium includes any mechanism that provides (i.e., stores and/or transmits) information in a form accessible by a machine (e.g., a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 100 of FIG. 8.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine-implemented method, comprising:
identifying a first frame;
determining whether the first frame needs to be shielded; and
transmitting a second frame having at least a portion that is a duplicate of the first frame in response to the determining that the first frame needs to be shielded, wherein the first frame has data encrypted with a first encryption and the second frame has the data encrypted with a second encryption.

2. The machine-implemented method of claim 1, wherein the transmitting the second is performed using one or more stealth techniques to make the second frame appear indistinguishable from the first frame to a hacker.

3. The machine-implemented method of claim 1, wherein the second frame has data encrypted with an invalid integrity check value.

4. The machine-implemented method of claim 1, wherein the second frame has a fake station address.

5. The machine-implemented method of claim 1, wherein the transmitting of the second frame is performed with a variable signal strength.

6. The machine-implemented method of claim 1, wherein the second frame has a current frame sequence number.

7. The machine-implemented method of claim 1, wherein a transmission rate of the second frame is determined based on the transmission rate of the first frame.

8. The machine-implemented method of claim 1, further comprising:
identifying a third frame having a second content transmitted to an access point;
transmitting a fourth frame having at least a portion of the second content to the access point based on the identifying;
identifying a retransmission of the third frame having a third content by the access point; and
transmitting a fifth frame having at least a portion of the third content based on the retransmission.

9. The machine-implemented method of claim 8, wherein the first frame includes a first address resolution protocol ("ARP") reply sent by an access point, and the second frame includes a second ARP reply having at least a portion of a content of the first ARP reply sent by the access point the third frame includes a first ARP request to an access point; the fourth frame includes a second ARP request having at least a portion of a content of the first ARP request to the access point; the fifth frame includes a third ARP request having at least a portion of the retransmitted first ARP request to the access point.

10. The machine-implemented method of claim 1, further comprising:
determining whether the first frame has an ARP format.

11. The machine-implemented method of claim 1, further comprising:
monitoring one or more frames to determine a current frame sequence number.

12. The machine-implemented method of claim 8, wherein each of the fourth frame, and the fifth frame has a current frame sequence number.

13. The machine-implemented method of claim 8, wherein a transmission rate of the fourth frame is determined based on the transmission rate of the third frame; and a transmission rate of the fifth frame is determined based on the transmission rate of the third frame.

14. The machine-implemented method of claim 8, wherein each of the fourth frame and the fifth frame is transmitted with a variable signal strength.

15. A non-transitory machine-readable medium storing executable program instructions which cause a data processing system to perform operations, comprising:
identifying a first frame;
determining whether the first frame needs to be shielded; and
transmitting a second frame having at least a portion that is a duplicate of the first frame in response to the determining that the first frame needs to be shielded, wherein the first frame has data encrypted with a first encryption and the second frame has the data encrypted with a second encryption.

16. The non-transitory machine-readable medium of claim 15, wherein the transmitting the second frame is performed using one or more stealth techniques to make the second frame appear indistinguishable from the first frame to a hacker.

17. The non-transitory machine-readable medium of claim 15, wherein the second frame has data encrypted with an invalid integrity check value.

18. The non-transitory machine-readable medium of claim 15, wherein the second frame has a fake station address.

19. The non-transitory machine-readable medium of claim 15, wherein the transmitting of the second frame is performed with a variable signal strength.

20. The non-transitory machine-readable medium of claim 15, wherein the second frame has a current frame sequence number.

21. The non-transitory machine-readable medium of claim 15, wherein a transmission rate of the second frame is determined based on the transmission rate of the first frame.

22. The non-transitory machine-readable medium of claim 15, further including instructions that cause the data processing system to perform operations comprising:
identifying a third frame having a second content transmitted to an access point;
transmitting a fourth frame having at least a portion of the second content to the access point based on the identifying;
identifying a retransmission of the third frame having a third content by the access point; and
transmitting a fifth frame having at least a portion of the third content based on the retransmission.

23. The non-transitory machine-readable medium of claim 15, wherein the first frame includes a first address resolution protocol ("ARP") reply sent by an access point, and the second frame includes a second ARP reply having at least a portion of a content of the first ARP reply sent by the access point the third frame includes a first ARP request to an access point; the fourth frame includes a second ARP request having at least a portion of a content of the first ARP request to the access point; the fifth frame includes a third ARP request having at least a portion of the retransmitted first ARP request to the access point.

24. The non-transitory machine-readable medium of claim 15, further including instructions that cause the data processing system to perform operations comprising determining whether the first frame has an ARP format.

25. The non-transitory machine-readable medium of claim 15, further including instructions that cause the data processing system to perform operations comprising:
monitoring one or more frames to determine a current frame sequence number.

26. The non-transitory machine-readable medium of claim 23, wherein each of the fourth frame, and the fifth frame has a current frame sequence number.

27. The non-transitory machine-readable medium of claim 23, wherein a transmission rate of the fourth frame is determined based on the transmission rate of the third frame; and a transmission rate of the fifth frame is determined based on the transmission rate of the third frame.

28. The non-transitory machine-readable medium of claim 23, wherein each of the fourth frame and the fifth frame is transmitted with a variable signal strength.

29. A system, comprising:
a memory, and
a processor coupled to the memory, wherein the processor is configured identify a first frame; to determine whether the first frame needs to be shielded; and
to transmit a second frame having at least a portion that is a duplicate of the first frame in response to the determining that the first frame needs to be shielded, wherein the first frame has data encrypted with a first encryption and the second frame has the data encrypted with a second encryption.

30. The system of claim 29, wherein the transmitting the second frame is performed based on one or more stealth techniques to make the second frame appear indistinguishable from the first frame to a hacker.

31. The system of claim 29, wherein the second frame has data encrypted with an invalid integrity check value.

32. The system of claim 29, wherein the second frame has a fake station address.

33. The system of claim 29, wherein the transmitting of the second frame is performed with a variable signal strength.

34. The system of claim 29, wherein the second frame has a current frame sequence number.

35. The system of claim 29, wherein a transmission rate of the second frame is determined with the transmission rate of the first frame.

36. The system of claim 29, wherein the processor is further configured to
identify a third frame having a second content transmitted to an access point;
transmit a fourth frame having at least a portion of the second content to the access point based on the identifying;
identify a retransmission of the third frame having a third content by the access point; and
transmit a fifth frame having at least a portion of the third content based on the retransmission.

* * * * *